United States Patent
De La Tousche et al.

(10) Patent No.: US 9,738,384 B2
(45) Date of Patent: Aug. 22, 2017

(54) AIRCRAFT FLIGHT DECK AUDIO SYSTEM AND A METHOD FOR CONTROLLING SUCH AN AUDIO SYSTEM

(71) Applicant: Airbus Operations (SAS), Toulouse (FR)

(72) Inventors: Francois De La Tousche, Toulouse (FR); Benoit Gauduin, Toulouse (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 164 days.

(21) Appl. No.: 14/754,959

(22) Filed: Jun. 30, 2015

(65) Prior Publication Data

US 2015/0375863 A1 Dec. 31, 2015

(30) Foreign Application Priority Data

Jun. 30, 2014 (FR) ...................... 14 56167

(51) Int. Cl.
  *H04B 3/00* (2006.01)
  *B64D 11/00* (2006.01)
  (Continued)

(52) U.S. Cl.
  CPC ........... *B64D 11/0015* (2013.01); *H04R 3/12* (2013.01); *H04R 29/00* (2013.01); *H04R 5/04* (2013.01); *H04R 2499/13* (2013.01)

(58) Field of Classification Search
  USPC ........................................................ 381/85
  See application file for complete search history.

(56) References Cited

U.S. PATENT DOCUMENTS

| 2,733,296 A | * | 1/1956 | Maggio | .................... H04B 1/74 370/227 |
| 3,681,694 A | * | 8/1972 | Sarati | ....................... H04B 1/74 340/2.9 |

(Continued)

FOREIGN PATENT DOCUMENTS

WO 2006052772 5/2006

OTHER PUBLICATIONS

French Search Report, Apr. 21, 2015.
"AV-900 Digital Audio System Remote Audio Processor", Sep. 30, 2005.

*Primary Examiner* — Joseph Saunders, Jr.
*Assistant Examiner* — James Mooney
(74) *Attorney, Agent, or Firm* — Greer, Burns & Crain, Ltd.

(57) ABSTRACT

An aircraft flight deck audio system, including a central management unit and pilot, co-pilot and third-man terminals. Estimation units estimate the quality of uplink and/or downlink digital signals of the pilot and co-pilot terminals. A control unit is configured such that, when the quality of the digital signals on the uplink and/or the downlink of the pilot or co-pilot terminal is estimated as unsatisfactory, the digital signals intended for the pilot or co-pilot terminal are routed toward the third-man terminal downlink and the digital signals originating from the third-man terminal and present on the uplink are routed toward the output of the pilot or co-pilot terminal. Transceiver units of the pilot, co-pilot and third-man terminals, respectively, transmit the digital signals of the pilot or co-pilot terminal on the third-man terminal downlink and the digital signals on the uplink of the third-man terminal toward the pilot or co-pilot terminal.

10 Claims, 4 Drawing Sheets

(51) Int. Cl.
*H04R 3/12* (2006.01)
*H04R 29/00* (2006.01)
*H04R 5/04* (2006.01)

(56) References Cited

U.S. PATENT DOCUMENTS

| 4,985,904 | A | * | 1/1991 | Ogawara | H04B 1/74 |
|---|---|---|---|---|---|
| | | | | | 340/2.9 |
| 2004/0157555 | A1 | | 8/2004 | Richenstein et al. | |
| 2011/0206211 | A1 | * | 8/2011 | Dahan | H04H 20/62 |
| | | | | | 381/58 |

* cited by examiner

AIRCRAFT FLIGHT DECK AUDIO SYSTEM AND A METHOD FOR CONTROLLING SUCH AN AUDIO SYSTEM

CROSS-REFERENCES TO RELATED APPLICATIONS

This application claims the benefit of the French patent application No. 1456167 filed on Jun. 30, 2014, the entire disclosures of which are incorporated herein by way of reference.

BACKGROUND OF THE INVENTION

The present invention relates to an aircraft flight deck audio system and a method for controlling such an audio system.

The audio system shown in FIG. 1 includes a central management unit 10 and three terminals 20a, 20b and 20c, referred to below as the pilot terminal, the co-pilot terminal and the third-man terminal respectively. Each terminal 20 (a reference without a letter denotes a terminal or an element of any one of the terminals 20) comprises a headset 21 provided with two earphones 21L and 21R and a microphone 22. Generally speaking, it could also comprise a handheld microphone, an oxygen-mask microphone, one or two loudspeakers for the pilot and also the co-pilot. The signals processed by each terminal 20 are digital signals. Each terminal 20 also comprises an analog/digital converter 23 enabling the analog signals originating from the microphone 22 to be digitized. Similarly, each terminal 20 comprises an analog/digital converter 24 enabling the signals that will be supplied to the earphones 21R and 21L to be converted into analog form.

Each terminal 20 is connected to the central management unit 10 via an uplink 30 to supply the digital signals originating from the microphone 22 of said terminal 20 (via the converter 23) to this central unit 10 and a downlink 31 to supply digital signals originating from the central unit 10 to the headset 21 of said terminal 20 (via the converter 24).

In a manner known per se, the central management unit 10 comprises a router 11 which, on the one hand, routes the digital signals of each of the uplinks 30 originating from the microphones 22 to its corresponding output S (toward the output Sa for the uplink 30a, the output Sb for the uplink 30b and the output Sc for the uplink 30c), and, on the other hand, routes the digital signals present on an input E toward the corresponding downlink 31 (the input Ea toward the downlink 31a, the input Eb toward the downlink 31b and the input Ec toward the downlink 31c).

According to aeronautical procedures, if an audio link between a terminal of either the pilot 20a or the co-pilot 20b and the central management unit 10 is defective, the aircraft is not authorized to take off, which incurs relatively high indirect costs. A need therefore exists for a solution enabling this risk to be minimized without jeopardizing flight safety.

SUMMARY OF THE INVENTION

Figure 1:
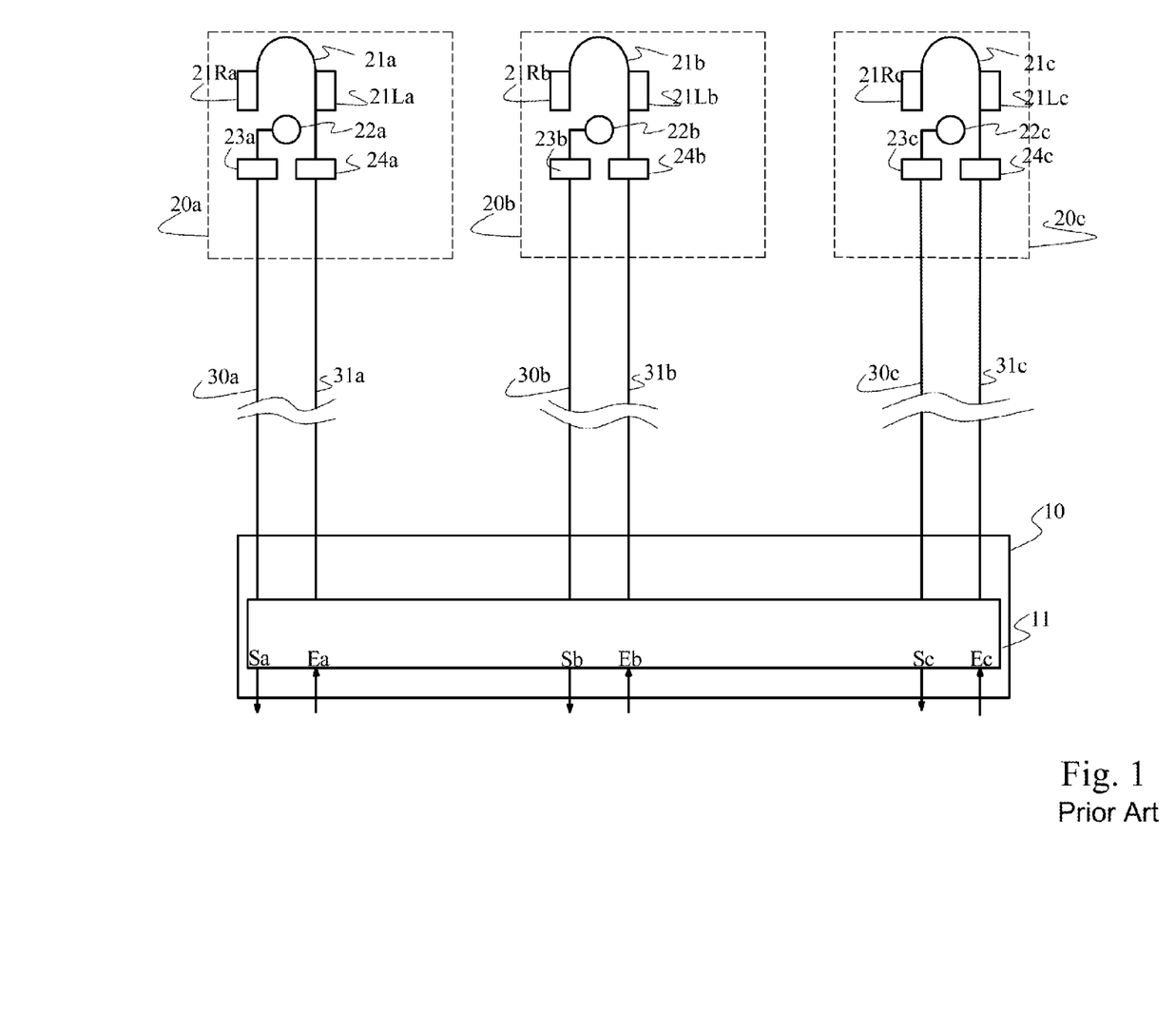
FIG. 1 is a view of an aircraft flight deck audio system according to the prior art.

An object of the present invention is to provide an audio system as shown in FIG. 1 which comprises means to overcome the problem described above.

For this purpose, an aircraft flight deck audio system of the type including a central management unit and a pilot terminal, a co-pilot terminal and a third-man terminal, each terminal including at least a headset and a microphone and being connected to said central management unit via an uplink to supply it with signals originating from the microphone and converted into digital signals and a downlink to supply digital signals originating from the central unit to the headset of said terminal following their conversion into analog signals, said central management unit comprising a router provided to route the digital signals intended for the pilot, co-pilot and third-man terminals respectively toward the corresponding downlinks and to route the digital signals originating from the respective terminals and present on the uplinks toward the outputs of the router corresponding to said terminals.

According to the invention, said system is characterized in that it furthermore includes:

estimation units for estimating the quality of the digital signals on the uplinks and/or the downlinks of the pilot and co-pilot terminals, a control unit which controls said router in such a way that, in a situation where the quality of the digital signals on the uplink and/or the downlink of the pilot and co-pilot terminal is estimated as unsatisfactory by one of said estimation units, it routes the digital signals intended for the pilot or co-pilot terminal, as appropriate, toward the third-man downlink and to route the digital signals originating from the third-man terminal and present on the uplink toward the pilot or co-pilot output, and transceiver units of the terminals respectively to transmit in a situation where the quality of the digital signals on the pilot or co-pilot uplink and/or downlink is estimated as unsatisfactory by one of said estimation units, said digital signals of the pilot or co-pilot terminal on the third-man downlink and said digital signals on the third-man uplink toward the pilot or co-pilot terminal.

BRIEF DESCRIPTION OF THE DRAWINGS

The characteristics of the invention mentioned above, and also other characteristics, will be more clearly evident from a reading of the following description of an example embodiment, said description being given in relation to the attached drawings, in which.

DETAILED DESCRIPTION OF THE PREFERRED EMBODIMENTS

The audio system shown in FIG. 2 includes a central management unit 10 and three terminals 20a, 20b and 20c, referred to below as the pilot terminal, the co-pilot terminal and the third-man terminal respectively. Each terminal 20 includes a headset 21 provided with two earphones 21L and 21R and a microphone 22. Generally speaking, each terminal 20 could also comprise a handheld microphone, an oxygen-mask microphone, one or two loudspeakers for the pilot and also the co-pilot (not shown). The signals processed by each terminal 20 are digital signals. Each terminal 20 also comprises an analog/digital converter 23 enabling the analog signals originating from the microphone 22 to be digitized. Similarly, each terminal 20 comprises an analog/ digital converter 24 enabling the signals that will be supplied to the earphones 21R and 21L to be converted into analog form.

Each terminal 20 is connected to the central management unit 10 via an uplink 30 to supply the digital signals originating from the microphone 22 of said terminal 20 (via the converter 23) to this central unit 10 and a downlink 31 to supply digital signals originating from the central unit 10 to the headset 21 of said terminal 20 (via the converter 24).

The central management unit 10 comprises a router 11 which, on the one hand, routes the digital signals of each of the uplinks 30 originating from the microphones 22 to its corresponding output S (toward the output Sa for the uplink 30a, the output Sb for the uplink 30b and the output Sc for the uplink 30c), and, on the other hand, routes the digital signals present on an input E toward the corresponding downlink 31 (the input Ea toward the downlink 31a, the input Eb toward the downlink 31b and the input Ec toward the downlink 31c).

According to the invention, the central management unit 10 also comprises estimation units 12 and 13 to estimate respectively the quality of the digital signals present on the uplink 30a and the downlink 30b originating respectively from the microphones 22a and 22b of the pilot terminal 20a and the co-pilot terminal 20b and to deliver the quality estimation signals, denoted respectively Ema and Emb. Each quality estimation signal Ema and Emb is a binary signal having a first value (for example 1) when the quality of the digital signals is deemed to be satisfactory and having a second value (for example 0) when this quality is deemed to be unsatisfactory.

For example, the estimation units 12 and 13 estimate the bit error rate (BER), compare this estimated bit error rate with a threshold rate and deliver a binary quality estimation signal having a first value (for example 1) when the bit error rate BER is lower than the threshold value and having a second value (for example 0) when the bit error rate BER is higher than the threshold rate. The digital signals on the uplinks and downlinks 30 and 31 are signals which, in addition to data representing audio signals, include a cyclic redundancy check (CRC). The estimation units 12 and 13 use this cyclic redundancy check CRC, for example, to estimate the bit error code BER.

The quality estimation signals Ema and Emb delivered by the estimation units 12 and 13 are supplied to a control unit 14 (central unit) which controls the router 11 of the central management unit 10 by means of a control signal C.

When the quality of the digital signals on the uplinks 30a and 30b is deemed to be satisfactory by the estimation units 12 and 13 (in the embodiment mentioned above, the bit error rates BER estimated by the estimation units 12 and 13 are lower than the threshold rate) the control signal C delivered by the control unit 14 controls the router 11 in such a way that it operates in the conventional manner described above. Conversely, when the quality of the digital signals on the uplink 30a of the pilot terminal 20a is deemed to be unsatisfactory by the estimation unit 12 (the bit error rate BER estimated by the estimation unit 12 is higher than the threshold rate), the control signal C controls the router 11 in such a way that the digital signals on the uplink 30c of the third-man terminal 20c are routed toward the output Sa of the router 11 and in such a way that the digital signals present on the input Ea of the router 11 and intended for the pilot terminal 20a are routed on the downlink 31c of the third-man terminal 20c. Similarly, when the quality of the digital signals on the uplink 30b of the co-pilot terminal 20b is deemed to be unsatisfactory by the estimation unit 13 (the bit error rate BER estimated by the estimation unit 13 is higher than the threshold rate) the control signal C delivered by the control unit 14 controls the router 11 in such a way that the digital signals on the uplink 30c of the third-man terminal 20c are routed toward the output Sb of the router 11 and in such a way that the digital signals present on the input Eb of the router 11 and intended for the co-pilot terminal 20b are routed on the downlink 31c of the third-man terminal 20c.

The control signal C delivered by the control unit 14 is inserted into the digital signals of the uplink 31c of the third-man terminal 20c to be transmitted to the third-man terminal 20c.

The pilot terminal 20a and the co-pilot terminal 20b comprise transceiver units 25a and 25b respectively which are provided to communicate bidirectionally with a transceiver unit 26 which the third-man terminal 20c comprises. Each link between a transceiver unit 25a or 25b of a terminal 20a or 20b with the transceiver unit 26 of the terminal 20c is bidirectional and is, for example, a radiofrequency link (standard IEEE 802.11, such as Wi-Fi®, standard IEEE 802.15, such as Bluetooth®, etc.) or an optical link (LiFi, laser, etc.) or other link.

The terminal 20c is also provided with a switch 27 which can assume two positions. In the first position, the digital signals present on the downlink 31c are supplied to the converter 24c and the digital signals at the output of the converter 23c are delivered on the uplink 30c. In the second position, the digital signals present on the downlink 31c are supplied to the transceiver unit 26 and the signals delivered by the transceiver unit 26 are delivered on the uplink 30c. The switch 27 is controlled by the control signal C present in the digital signals of the downlink 31c.

When this control signal C corresponds to a situation where the qualities of the digital signals on the uplinks 30a and 30b of the terminals 20a and 20b are deemed to be satisfactory by estimation units 12 and 13, the uplink 30c and downlink 31c of the third-man terminal 20c are connected, via the switch 27 in the first position, to the converters 23 and 24 of the third-man terminal 20c. Conversely, when this control signal C corresponds to a situation where the quality of the digital signals either on the uplink 30a of the pilot terminal 20a or on the uplink 30b of the co-pilot terminal 20b is deemed to be unsatisfactory by the estimation units 12 or 13, the uplink 30c and downlink 31c of the third-man terminal 20c are connected, via the switch 27 in the second position, to the transceiver unit 26 of the third-man terminal 20c.

According to one alternative embodiment, the pilot terminal 20a and the co-pilot terminal 20b are furthermore provided with quality estimation units 28 and 29 respectively for the purpose of estimating the quality of the digital signals present on the downlink 31a of the pilot terminal 20a and the downlink 31b of the co-pilot terminal 20b respectively and received from the management unit 10 and intended for the respective headsets 21 of the terminals 20a and 20b. Similar to the estimation units 12 and 13, the estimation units 28 and 29 deliver a binary quality estimation signal Eda and Edb having a first value (for example 1) when the quality of the digital signals is deemed to be satisfactory, and having a second value (for example 0) when this quality is deemed to be unsatisfactory.

The estimation units 28 and 29 are connected to the transceiver units 25a and 25b respectively in order to inject the quality estimation signals Eda and Edb into the digital signals which they transmit respectively to the transceiver unit 26. These quality signals Eda and Edb control the switch 27 in the same way as the control signal C. Moreover, they are transmitted, via the uplink 30c, to the control unit 14 which processes them in the same way as it processes the quality signals Ema and Emb in order to produce the control signal C and control the router 11. The estimation units 28 and 29 enable the quality of the uplinks 30a and 30b to be estimated and the router 11 and the switch 27 to be controlled in the same way as the estimation units 12 and 13 enable this for the downlinks 31a and 31b.

These estimation units 28 and 29 operate in combination with the estimation units 12 and 13. In a different embodiment, these estimation units 28 and 29 are substituted for the estimation units 12 and 13.

The operation of the audio system according to the present invention is as follows.

In a situation where the qualities of the digital signals on the uplinks 30a and 30b are deemed to be satisfactory by estimation units 12 and 13 and/or the qualities of the digital signals on the downlinks 31a and 31b are deemed to be satisfactory by the estimation units 28 and 29, the operation of the audio system according to the present invention is conventional. Each of the terminals 20a, 20b and 20c transmits and receives digital signals from the router 11 via its uplink 30a, 30b and 30c and its downlink 31a, 31b and 31c respectively. In the router 11, the digital signals are routed from the inputs Ea, Eb and Ec toward the corresponding downlinks 31a, 31b and 31c and corresponding uplinks 30a, 30b and 30c toward the corresponding outputs Sa, Sb and Sc.

Conversely, in a situation where the quality of the digital signals on the pilot uplink 30a and/or downlink 31a is deemed to be unsatisfactory by the estimation unit 12 and/or the estimation unit 28, the control unit 14 generates the control signal C to control the router 11 as explained above and inserts this control signal C into the downlink 31c of the third-man terminal 20c and the switch 27 is positioned in the second position explained above. Therefore, the audio signal delivered by the microphone 22 of the pilot terminal 20a is digitized by the converter 23a and the resulting digital signals are supplied, on the one hand, to the uplink 30a and, on the other hand, to the transceiver unit 25a. These digital signals are transmitted to the transceiver unit 26, then, via the switch 27, to the uplink 30c of the third-man terminal 20c. In the router 11, these signals are routed toward the output Sa corresponding to the pilot terminal 20a. The digital signals on the input Ea corresponding to the pilot terminal 20a are routed via the router 11 toward the downlink 31c of the third-man terminal 20c then, via the switch 27, to the transceiver unit 26. They are transmitted to the transceiver unit 25a of the pilot terminal 20a and from there to the converter 24 where they are converted into analog signals and transmitted to the earphones 21Ra and 21La of the pilot terminal 20a.

In this situation, the pilot terminal 20a therefore transmits and receives digital signals from the router 11 via the uplink 30c and the downlink 31c of the third-man terminal 20c via the transceiver units 25a and 26. Furthermore, in the router 11, the digital signals of the input Ea corresponding to the pilot are routed toward the downlink 31c of the third-man terminal 20c and the signals on the uplink 30c of the terminal 20c toward the output Sa corresponding to the pilot. Furthermore, the router 11 no longer routes the digital signals on the input Ec corresponding to the third man toward the downlink 31c and no longer routes the digital signals of the uplink 30c toward the output Sc corresponding to the third man.

Similarly, in a situation where the quality of the digital signals on the co-pilot uplink 30b and/or downlink 31b is deemed to be unsatisfactory by the estimation unit 13 and/or the estimation unit 29, the control unit 14 controls the router 11 as explained above and inserts the control signal C into the downlink 31c of the third-man terminal 20c and the switch 27 is positioned in the second position explained above. The audio signals delivered by the microphone 22b of the co-pilot terminal 20b are therefore digitized by the converter 23b and the resulting digital signals are supplied, on the one hand, to the uplink 30b and, on the other hand, to the transceiver unit 25b. These digital signals are transmitted to the transceiver unit 26 then, via the switch 27, to the uplink 30c of the third-man terminal 20c. In the router 11, these signals are routed toward the output Sb corresponding to the co-pilot terminal 20b. The digital signals on the input Eb corresponding to the co-pilot terminal 20b are routed by the router 11 toward the downlink 31c of the third-man terminal 20c then, via the switch 27, to the transceiver unit 26. They are transmitted to the transceiver unit 25b of the co-pilot terminal 20b and then to the converter 24b where they are converted into analog signals and are transmitted to the earphones 21Rb and 21Lb of the co-pilot terminal 20b.

In this situation, the co-pilot terminal 20b therefore transmits and receives digital signals from the router 11 via the uplink 30c and the downlink 31c of the third-man terminal 20c, via the transceiver units 25b and 26. Furthermore, in the router 11, the digital signals of the input Eb corresponding to the co-pilot are routed toward the downlink 31c of the third-man terminal 20c and the signals on the uplink 30c of the third-man terminal 20c toward the output Sb corresponding to the co-pilot.

Furthermore, the router 11 no longer routes the digital signals on the input Ec corresponding to the third man toward the downlink 31c and no longer routes the digital signals of the uplink 30c toward the output Sc corresponding to the third man.

Figure 3:
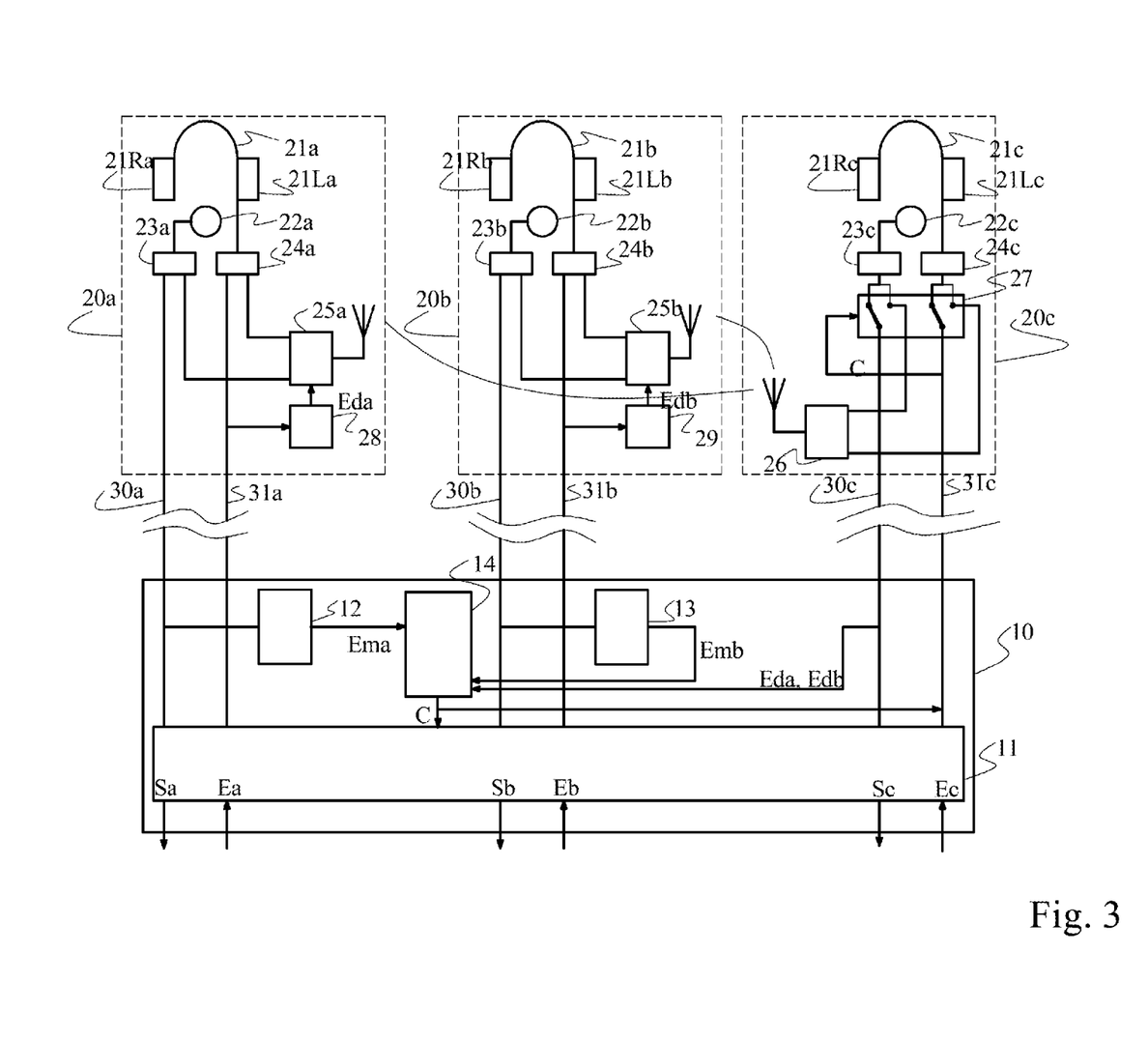
FIG. 3 is a view of an aircraft flight deck audio system according to a different embodiment of the present invention.

FIG. 3 shows a different embodiment of the present invention according to which the converters 23c and 24c are still connected to the uplink 30c and the downlink 31c regardless of whether the switch 27 is in its first or in its second position.

As in the preceding embodiment, the digital signals on the downlink 31c are routed in the router 11 toward the output Sa corresponding to the pilot terminal 20a and the digital signals on the input Ea corresponding to the pilot terminal 20a are routed toward the downlink 30c of the terminal 20c. In this embodiment, regardless of the quality of the digital signals on the pilot or co-pilot uplinks 30a or 30b and/or downlinks 31a and 31b, the router 11 routes the digital signals on the input Ec corresponding to the third man toward the downlink 31c and routes the digital signals of the uplink 30c toward the output Sc corresponding to the third man.

It will be noted that the bandwidth on the uplink 30c and the downlink 31c is split between the pilot and co-pilot data and the third-man data.

Figure 2:
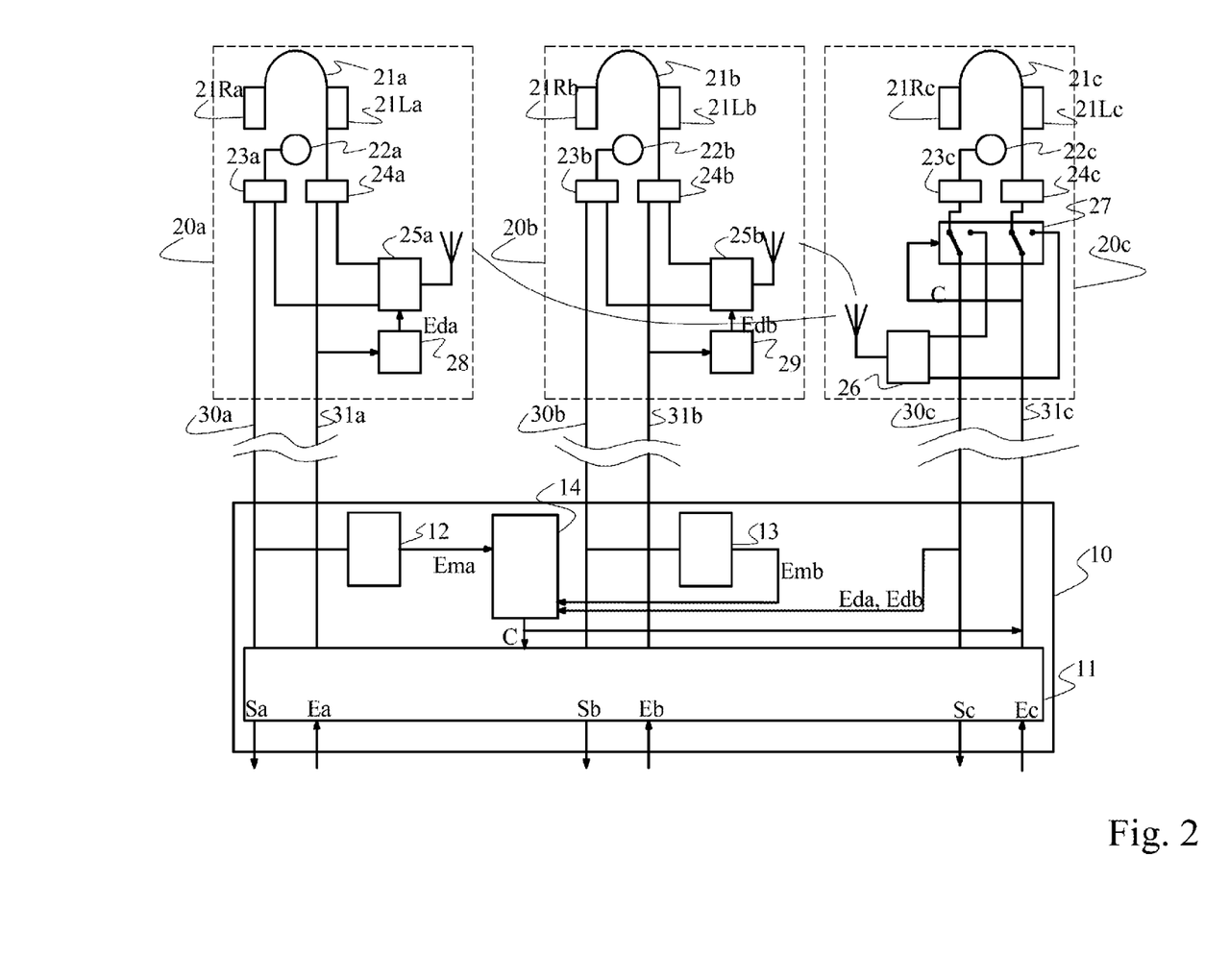
FIG. 2 is a view of an aircraft flight deck audio system according to one embodiment of the present invention.

The present invention also relates to a method for controlling an aircraft flight deck audio system of the type shown in FIG. 2 or in FIG. 3. This method, described in relation to FIG. 4, includes a routing step E1 for routing the digital signals intended for the pilot, co-pilot and third-man terminals (20a, 20b, 20c) respectively toward the corresponding downlinks (31a, 31b, 31c) and to route the digital signals originating from the respective terminals (20a, 20b, 20c) and present on the uplinks (30a, 30b, 30c) toward the outputs (Sa, Sb, Sc).

Figure 4:
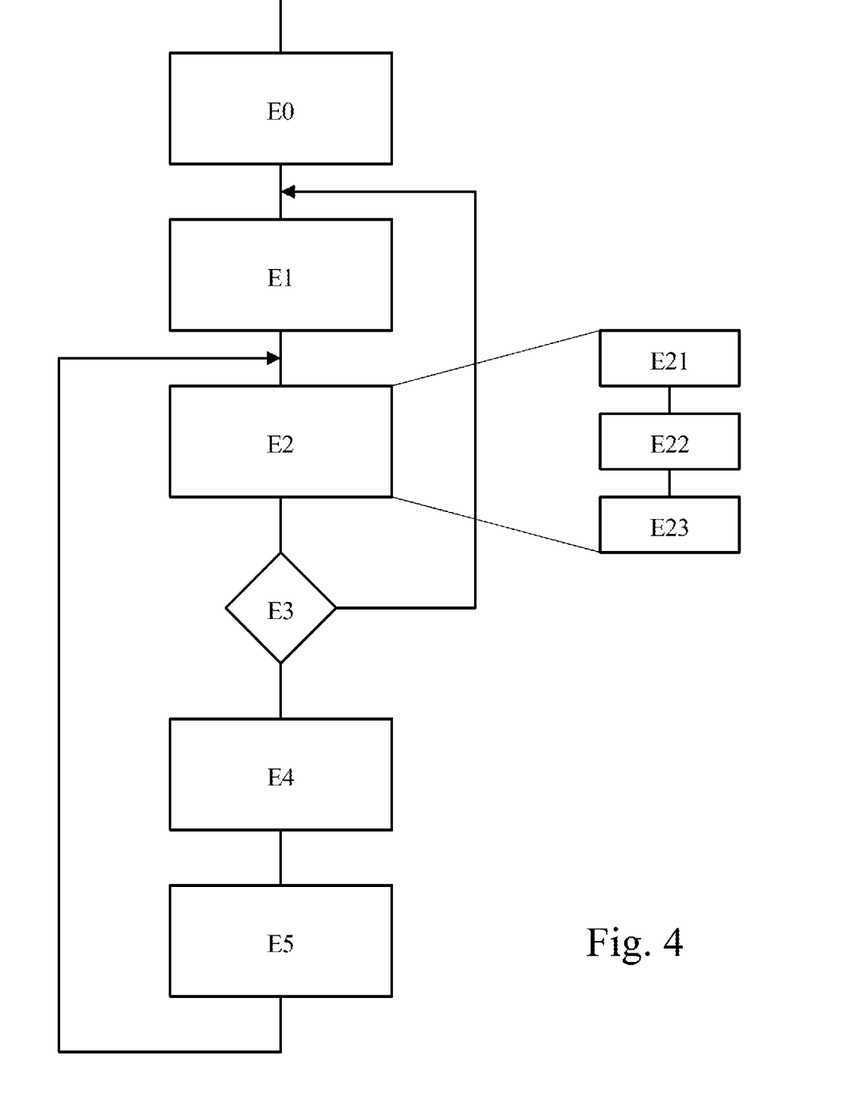
FIG. 4 is a schematic view of a method for controlling the audio system shown in FIG. 2 or FIG. 3.

This method furthermore includes an estimation step E2 for estimating the quality of the digital signals on the uplinks (30a and 30b) and/or the downlinks (31a and 31b) of the pilot and co-pilot terminals (20a and 20b).

If this quality is deemed to be satisfactory, in a step E3, the routing established by the routing step E1 is not modified. Conversely, in a situation where the quality of the digital signals on the pilot or co-pilot uplink (30a or 30b) and/or downlink (31a or 31b) is estimated as unsatisfactory during said estimation step E2, a step E4 of routing the digital signals intended for the pilot or co-pilot terminal (20a or 20b), as appropriate, toward the third-man downlink (31c) and to route the digital signals originating from the third-man terminal (20c) and present on the uplink (30c) toward the pilot or co-pilot output (Sa or Sb), and also a step E5 of transmitting said digital signals from the pilot or co-pilot terminal (20a or 20b) on the third-man downlink (30c) and said digital signals on the third-man uplink (31c) toward the pilot or co-pilot terminal (20a or 20b) are implemented.

Said method may comprise a step E0 wherein, regardless of the quality of the digital signals on the pilot or co-pilot uplink (30a or 30b) and/or downlink (31a or 31b), the signals originating from the microphone (22c) of the third-man terminal (20c) are supplied, following their digitization, to the uplink (30c) and the digital signals present on the downlink (31c) of said terminal (20c) are supplied to the headset (21c) of said terminal (20c) following their analog conversion.

Similarly, the routing step E1 can be provided, regardless of the quality of the digital signals on the pilot or co-pilot uplink (30a or 30b) and/or downlink (31a or 31b), in order to route the digital signals intended for the third-man terminal (20c) toward the downlink (31c) and to route the digital signals of the uplink (30c) toward the output (Sc) corresponding to the third man.

According to one embodiment of the invention, the routing step D5 is provided, in a situation where the quality of the digital signals on the pilot or co-pilot uplinks (30a or 30b) and/or downlinks (31a and 31b) is deemed to be unsatisfactory, in order to no longer route the digital signals present on the input (Ec) and intended for the third-man terminal (20c) toward the downlink (31c) and in order to no longer route to the digital signals of the uplink (30c) toward the output (Sc) corresponding to the third man.

The estimation step E2 includes, for example:
a sub-step E21 of estimating a bit error rate BER,
a sub-step E22 of comparing this bit error rate with a threshold rate, and
a sub-step E23 of delivering a satisfactory quality estimation signal when the bit error rate BER is lower than a threshold rate, and an unsatisfactory quality estimation signal when the bit error rate BER is higher than the threshold rate.

For example, the sub-step E21 of estimating the bit error rate uses a cyclic redundancy check CRC which the digital signals on the uplinks and downlinks comprise.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft flight deck audio system, comprising:
a central management unit and a pilot terminal,
a co-pilot terminal, and
a third-man terminal,
each terminal including at least a headset and a microphone and being connected to said central management unit via an uplink to supply it with signals originating from the microphone and converted into digital signals and a downlink to supply digital signals originating from the central unit to the headset of said terminal following their conversion into analog signals,
said central management unit comprising a router provided to route the digital signals intended for the pilot, co-pilot and third-man terminals respectively toward the corresponding downlinks and to route the digital signals originating from the respective terminals and present on the uplinks toward outputs of the router corresponding to said terminals,
estimation units designed to estimate a quality of the digital signals on at least one of the uplinks and the downlinks of the pilot and co-pilot terminals,
a control unit configured to control said router in such a way that, in a situation where the quality of the digital signals on at least one of the uplink and the downlink of the pilot and co-pilot terminal is estimated as unsatisfactory by one of said estimation units, said router routes the digital signals intended for the pilot or co-pilot terminal, as appropriate, toward the downlink of the third-man terminal and routes the digital signals originating from the third-man terminal and present on the uplink toward an output of the pilot or co-pilot terminal, and
transceiver units of the pilot terminal, co-pilot terminal and third-man terminal respectively to transmit, in a situation where the quality of the digital signals on at least one of the uplink and the downlink of the pilot or co-pilot terminal is estimated as unsatisfactory by one of said estimation units, said digital signals of the pilot or co-pilot terminal on the downlink of the third-man terminal and said digital signals on the uplink of the third-man terminal toward the pilot or co-pilot terminal.

2. The aircraft flight deck audio system as claimed in claim 1, further comprising a switch controlled by a control signal delivered by the control unit to switch between two positions:
a first position where the digital signals present on the downlink of the third-man terminal are supplied to the headset of the third-man terminal and the digital signals originating from the microphone of the third-man terminal are delivered on the uplink of the third-man terminal, and
a second position where the digital signals present on the downlink of the third-man terminal are supplied to the transceiver unit of the third-man terminal and the signals delivered by said transceiver unit are delivered on the uplink of the third-man terminal.

3. The aircraft flight deck audio system as claimed in claim 1, wherein said estimation units estimate at least the quality of the digital signals on the downlinks of the pilot and co-pilot terminals, and wherein said estimation units are configured to deliver quality estimation signals which are transmitted to said third-man terminal then, via the uplink of the third-man terminal to the control unit.

4. The audio system as claimed in claim 1, wherein the estimation units are configured to estimate a bit error rate.

5. The audio system as claimed in claim 4, wherein, in order to estimate the bit error rate, the estimation units are configured to use a cyclic redundancy check which the digital signals on the uplinks and downlinks comprise.

6. A method for controlling an aircraft flight deck audio system of the type including a central management unit and a pilot terminal, a co-pilot terminal and a third-man terminal, each terminal including at least a headset and a microphone and being connected to said central management unit via an uplink to supply it with signals originating from the microphone and converted into digital signals and a downlink to supply digital signals originating from the central unit to the headset of said terminal following their conversion into analog signals, said method comprising:
routing the digital signals intended for the pilot, co-pilot and third-man terminals respectively toward the corresponding downlinks and routing the digital signals originating from the respective terminals and present on the uplinks toward outputs corresponding to said terminals,
estimating a quality of the digital signals on at least one of the uplinks and the downlinks of the pilot and co-pilot terminals, and
implementing, in a situation where the quality of the digital signals on at least one of the pilot and co-pilot uplink and downlink is estimated as unsatisfactory during said estimating, the further steps of:
routing the digital signals intended for the pilot or co-pilot terminal, as appropriate, toward the downlink of the third-man terminal and routing the digital signals originating from the third-man terminal and present on the uplink toward a pilot or co-pilot output, and
transmitting said digital signals from the pilot or co-pilot terminal on the downlink of the third-man terminal and said digital signals on the third-man uplink toward the pilot or co-pilot terminal.

7. The method as claimed in claim 6, further comprising:
supplying the signals originating from the microphone of the third-man terminal following their digitization, to the uplink, and supplying the digital signals present on the downlink of said third-man terminal, to the headset of said third-man terminal following their conversion into analog signals, regardless of the quality of the digital signals on the pilot or co-pilot uplink and downlink.

8. The method as claimed in claim 6, wherein said step of routing the digital signals intended for the third-man terminal toward the downlink of said terminal toward an output corresponding to the third-man terminal occurs regardless of the quality of the digital signals on at least one of the uplink and the downlink of the pilot or co-pilot terminal.

9. The method as claimed in claim 6, wherein said step of routing is provided, in order to no longer route the digital signals present on an input of the third-man terminal and intended for the third-man terminal toward the downlink of said terminal and in order to no longer route the digital signals from the uplink of said terminal toward the output corresponding to the third-man terminal, in a situation where the quality of the digital signals on at least one of the pilot or co-pilot uplinks and downlinks is deemed to be unsatisfactory.

10. The method as claimed in claim 6, wherein said estimating comprises:
a sub-step of estimating a bit error rate,
a sub-step of comparing this bit error rate with a threshold rate, and
a sub-step of delivering a satisfactory quality estimation signal when the bit error rate is lower than the threshold rate, and an unsatisfactory quality estimation signal when the bit error rate is higher than the threshold rate.

* * * * *